United States Patent [19]

Yasuda

[11] Patent Number: 5,012,230

[45] Date of Patent: Apr. 30, 1991

[54] INPUT DEVICE FOR DIGITAL PROCESSOR BASED APPARATUS

[75] Inventor: Shiro Yasuda, Kanagawa, Japan

[73] Assignee: Sony Corporation, Tokyo, Japan

[21] Appl. No.: 177,940

[22] Filed: Apr. 5, 1988

[30] Foreign Application Priority Data

Apr. 7, 1987 [JP] Japan ................................ 62-85211

[51] Int. Cl.⁵ .............................................. G09G 5/08
[52] U.S. Cl. ...................................... 340/706; 340/709
[58] Field of Search ...................... 340/706, 709, 710; 178/18; 74/471 X; 273/148 R, 148 B; 200/252, 257, 547, DIG. 23

[56] References Cited

U.S. PATENT DOCUMENTS 4,092,532 5/1978 Hayes .................................. 340/710
4,670,743 6/1987 Zemke ................................ 340/709

FOREIGN PATENT DOCUMENTS 0081728 5/1984 Japan .................................. 340/709
0206933 11/1984 Japan .................................. 340/709

*Primary Examiner*—Jeffery A. Brier
*Attorney, Agent, or Firm*—Ronald P. Kananen

[57] ABSTRACT

An input device is provided with an operating member to be freely moved within a predetermined area by an external input force, such as a force exerted through an operator's finger or hand, for inputting given information by operating the operating member.

21 Claims, 3 Drawing Sheets

INPUT DEVICE FOR DIGITAL PROCESSOR BASED APPARATUS

BACKGROUND OF THE INVENTION

1. Field of the Invention

The present invention relates generally to an input devide for a digital processor based apparatus, such as a game computer. More specifically, the invention relates to an input device allowing smooth and swift manual input operation for the digital processor based apparatus, especially for shifting a cursor or other moving characters.

2. Description of the Background Art

A so-called game computer which displays a moving character or characters on a display screen, such as television screen, and allows movement of the character or characters for playing a pre-programed game, has become popular. In such a game computer, a manual controller for controlling movement and action of the character or characters is an important factor for enjoying the games. In some games, such as shooting games, fighting games, driving games or so forth, quick movement and action of the character or characters are required. Motion and/or action speed of the game character or characters is variable depending upon response of the controller in response to the manual input.

It is the conventional construction of such type of input device which includes an operation plate mounted in an opening formed through a controller housing in an input operation section, which is connected to the game computer through a cable. In order to move a character or characters displayed on the display screen, the operation plate is manually operated in a desired direction or directions including upper, lower, left, and right directions and in 45 degree-slanted directions against respective ones of them. The inputting operation is done by sliding a finger on this operation plate.

In order to rapidly move a character on the display, it is necessary to swiftly slide the finger on the operation plate for rapid inputting operation. The operation plate is usually molded of plastic and the inner surface of the finger slides on this operation plate. In practical products, the coefficient of friction between the finger and the plastic operation plate surface is usually as large as 0.7 to 0.8. Accordingly, it encounters a problem that the response cannot be not as quick. Thus, the conventional input device needs a large force to be applied on the finger for controlling the operation plate. So, it has a disadvantage that a smooth and rapid operation cannot be done.

SUMMARY OF THE INVENTION

Therefore, it is an object of the present invention to provide an input device which allows a smooth input operation with a light operational force.

Another object of the invention is to provide an input device, suitable for use in a controller of a game computer, which allows a smooth and quick input for playing games.

In order to accomplish the aforementioned and other objects, an input device, according to the present invention, is provided with an operating member to be freely moved within a predetermined area by an external input force, such as force exerted through an operator's finger or hand, for inputting given information by operating the operating member.

According to one aspect of the invention, a data input device comprises a controller assembly including a manually accessible movable member having a manually accessible section and a slider section integrally formed with the manually accessible section and slidably supported on a supporting base, the supporting base permitting movement of the movable member in a direction generally perpendicular to the direction of slide on the supporting base in response to depression force for inputting data, the controller assembly also including a guide means defining a area of sliding motion of the movable member on the supporting base, a resilient means for resiliently supporting the controller assembly at a plurality of supporting points, which resilient means being deformable in response to depression force, and electric means, responsive to deformation of the resilient means, for generating an output signal indicative of an input data corresponding to the position of the movable member, at which the inputting force is exerted.

According to another aspect of the invention, a data input device for a digital processor and the like, comprises a plurality of normally open switches respectively connected to corresponding output ports connected to the digital processor for inputting data, wherein each of the normally open switches comprises a pair of mutually separated stationary terminals on a stationary base and a movable contact movable between a first position in which it is positioned away from the stationary terminals, and a second position in which it contacts with the stationary terminals for establishing electrical communication therebetween and whereby permitting output of data through the output port, an elastically deformable contact carrier means which carries the movable contacts, the carrier means normally positioning the movable contact at the first position and allowing movement of the movable contact to the second position in response to an external depression force for inputting data, a slider base means having a flat and smooth surface section extending over at least a part of the contact carrier, the sliding base means having an actuation means associated with the contact carrier for selectively exerting the external depression force for causing shifting of at least one of the movable contact from the first position to second position, and a manually operable member having a surface mating with the flat and smooth surface of the supporting base means, the manually operable member being slidably movable on the supporting base means for allowing manual action of at least one of the normally open switches and transmitting depression force manually exerted thereonto for actuating the supporting base means.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
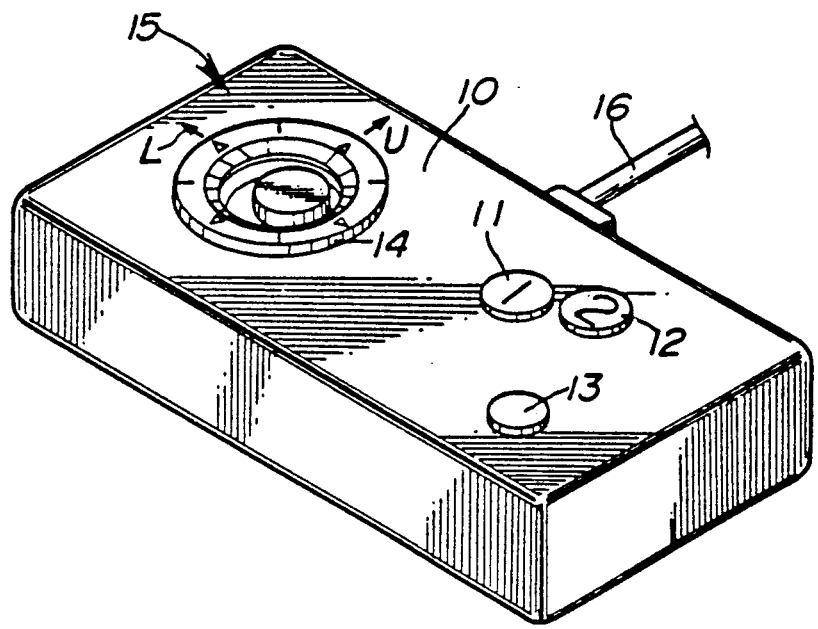
FIG. 1 is a perspective view showing the overall appearance of the device.

Referring now to the drawings, particularly to FIG. 1, the preferred embodiment of an input device herewith illustrated is particularly designed to be used as a controller for a game computer, such as a television game computer. Here, the word "game computer" or "television game computer" means a computer which can be loaded with a game software installed in a data recording medium in forms of a floppy disk, a disk cassette, or ROM or RAM cartridge, and so forth, and which converts data stored in the data recording medium into a television signal for visual display on a television screen. The image displayed on the television screen includes background image and moving character or characters performing game action.

It should be appreciated that though the discussion given herebelow will be concentrated to the input device used as the controller of the game computer, the application of the input device of the present invention should not be limited to the game computer but could be applied to any digital processor systems which require the same or a similar function as disclosed herein.

The shown input device has a flat and rectangular casing 10. In the shown embodiment, the casing 10 is made of a synthetic resin with upper and lower plates and side walls extending between the upper and lower plates. The casing 10 is practically composed of separately formed upper and lower sections which are assembled to form the flat and rectangular box-shaped body.

Push button switches 11, 12 and 13 are provided on the upper plate of the casing 10. These push button switches 11, 12 and 13 serve as function switches for inputting data for respectively pre-programmed action of the character or characters. In the practical embodiment, the push button switch 13 serves as a START switch and as a commander for starting a loaded game. In addition, the push button 13 may also serve as a pause comment switch for pausing the game. The push button switch 11 serves as a first function switch for inputting a first action command so that the character or characters in the game perform pre-programmed first action, such as shooting, jumping, accelerating or decelerating of motion speed and so forth. The push button switch 12 serves as another function switch for inputting a second input command so that the character of characters perform the pre-programmed first action or a second action different from that of the first action. As will be seen from FIG. 1, the push button switches 11 and 12 are arranged at a position adjacent one longitudinal edge and in a side-by-side relationship to each other so that both push button switches 11 and 12 can be operated with a common finger of the player. On the other hand, in the preferred construction, the push button 13 is arranged at a distanced position from the push button switches 11 and 12 to avoid mis-operation of the push button switch 13 as a pause switch so as not to unintentionally pause the game.

Further, a rotary controller 15 is arranged at a position adjacent the other longitudinal edge of the casing 10. The controller 15 includes an essentially disc-shaped movable member 22 with a finger accessible projection 22a which has a flat finger access surface 22b. The movable member 22 is disposed within a circular opening 21 defined by a stationary guide member 20. Preferably, notching or other suitable unevenness will be formed on the surface 22b so as to provide sufficient friction between the player's finger and the surface for better transmission of the input force through the player's finger to the movable member 22.

In a practical control operation, the player puts the finger on the finger access surface 22b of the movable member 22 so that the movable member may move within a circular region defined by the circular opening 21. The input through this controller 15 serves as a command for moving the character or characters in a direction identified by the direction toward which the movable member 22 is operated. Namely, when the movable member 22 is operated toward the left as shown by arrow L in FIG. 1, the character or characters move toward the left. Similarly, when the movable member 22 is operated toward an upward direction as identified by the arrow U in FIG. 1, the character or characters move upwardly on the television screen. Furthermore, the rotary controller 15 further shifts the character or characters in an oblique direction, i.e. 45° relative to a "two-dimensional coordinate system axes. For instance, when the movable member 22 is operated to be placed at approximately an intermediate position residing at the direction intermediate between the up-direction and left-direction set forth above, the character or characters may be moved in an up-left direction. Such position of the movable member 22 will be hereafter referred to as a "bi-directional input position". In addition, in some games, the rotary controller 15 also serves as a cursor shifting a command input switch for shifting cursor in a direction toward which the movable member 22 is operated.

The input device constructed as above is connected to a game computer (not shown) through a connector cable 16 which may have a connector (not shown) to be connected to an input port of the game computer.

Figure 3:
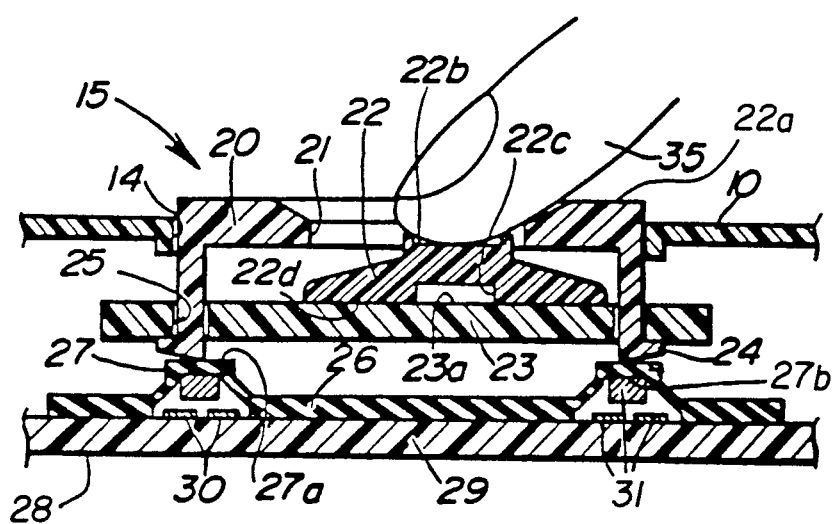
FIG. 3 is a longitudinal section of the input device shown in FIG. 1.
Figure 2:
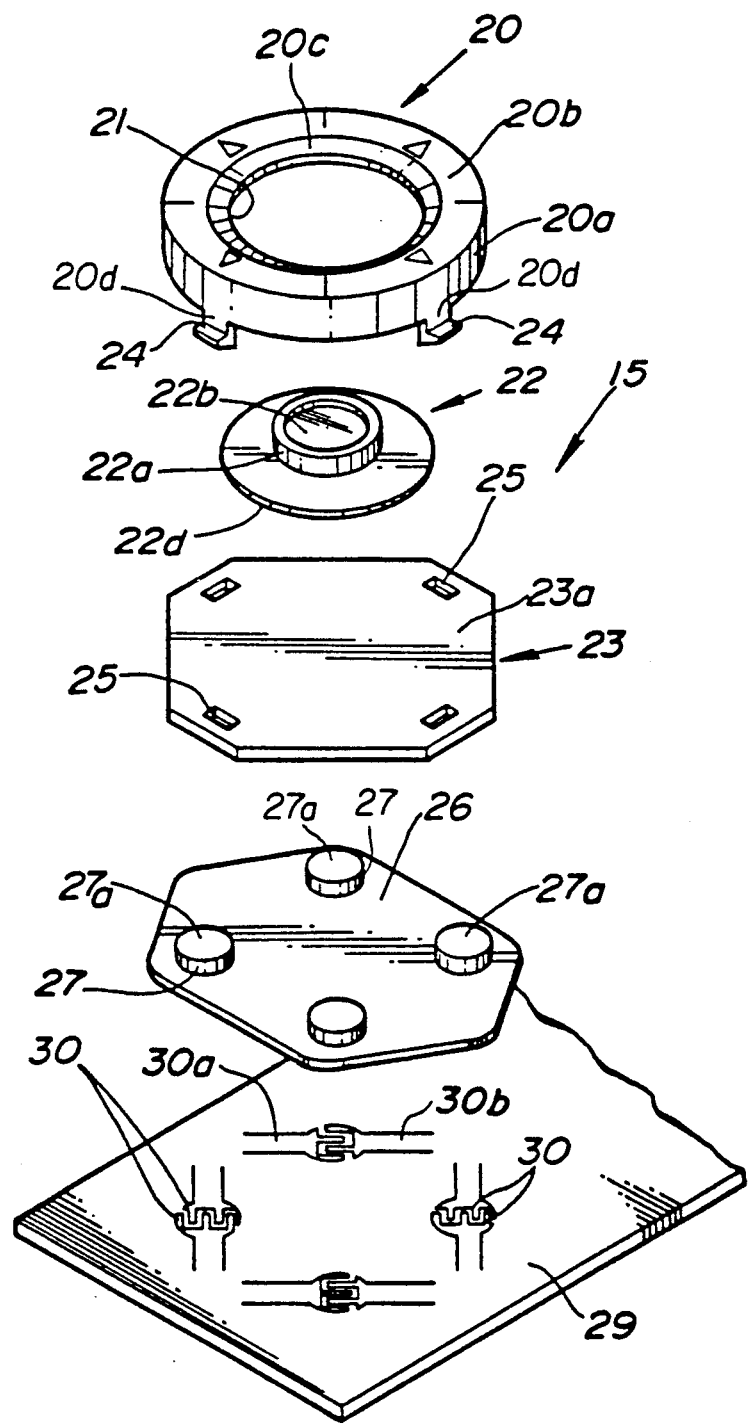
FIG. 2 is an exploded perspective view showing essential parts of the preferred embodiment of an input device according to the present invention.

Detailed discussion will be given herebelow with respect to the detailed construction of the rotary controller 15 with reference to FIGS. 2 and 3. As shown in FIGS. 2 and 3, the rotary controller 15 generally comprises the movable member 22, and the guide member 20 which defines the circular opening 21. The guide member 20 has a generally ring-shaped major section 20a with an inwardly extending flange section 20b. The ring-shaped major section 20a is loosely or thrustingly movably engaged with a through circular opening 14 formed through the upper plate of the casing 10. The flange section 20b has a slanted inner edge portion 20c defining the outer circumference of the circulate opening 21. The guide member 20 also has leg portions 20d extending from the edge of the major section 20a remote from the flange section 20b. Each leg portion 20d has an engaging hook 24 at the free end thereof. The hook 24 is of a generally wedge-shaped configuration slanting toward the free end. In the shown embodiment, the guide member 20 is provided with four leg portions 20d circumferentially arranged with regular intervals.

A supporting plate 23 is located beneath the guide member 20 and substantially in alognment with the guide member. The supporting plate 23 is of a generally square-shaped configuration with tapered corners and is of a size greater than the circular opening 14 of the upper plate of the casing 10. The supporting plate 23 is formed with a plurality of slots 25. Each slot 25 is so configured as to allow the hook 24 of the leg portion 22d of the guide member 20 to pass therethrough to establish a hooking engagement. Therefore, the supporting plate 23 as assembled with the guide member 20 serves as a retainer for retaining the guide member within the circular opening 14 of the casing 10. On the other hand, the supporting plate 23 has a substantially flat and smooth surface 23a which mates with a surface 22d of the movable member 22, which surface 22d is formed at a position remote from the finger access surface 22b for establishing face-to-face contact therebetween. In order to reduce friction between the mating surfaces 23a and 22d and assure smooth movement of the movable member 22 relative to the supporting plate 23, a cut-out or recess 22c is formed on the surface 22d to reduce contact area between the mating surfaces.

With the construction set forth above, the movable member can freely and smoothly move within an area defined by the circular opening 21 of the guide member 20.

Beneath the supporting plate 23 is located an elastically deformable and electrically non-conductive electrode cover 26. In the practical embodiment, the electrode cover 26 is formed of a rubber. However, the material to form the electrode cover is not limited to rubber but can be of any elastically deformable and electrically non-conductive material. For example, flexible and non-conductive synthetic resins may be used for forming the electrode cover. The electrode cover 26 is formed with essentially cylindrical projections 27 thinner than that of the major part of the cover to allow easier deformation. The cylindrical projections 27 are topped by a disc portion, integrally formed thereon, consisting of an upper surface 27a and a lower surface 27b. This disc portion extends substantially parallel to the upper and lower plates of the casing 10. An electrically conductive member 28 which serves as a movable contact is attached to the lower surface 27b of each cylindrical portion 27. As will be seen from FIG. 2 the cylindrical projections 27 are oriented in alignment with the slots 26 of the supporting member 23 and thus opposes the lower end of the respectively associated leg portion 20d at the surface 27a of the cylindrical projections 27.

A substrate 29 with printed electrodes 30 is provided below the electrode cover 26. Practically, the substrate 29 is mounted on the inner periphery of the lower plate of the casing. The printed electrodes 30 are oriented to oppose the respectively associated movable contact for forming direction command switches 31. As will be seen from FIGS. 2 and 3, each printed electrode 0 is composed of mutually separated first and second printed pattern segments 30a and 30b for constituting normally open switch elements so that first and second printed pattern segments 30a and 30b are connected to each other for establishing electric communication when the associated one of the movable contacts 28 contacts thereto. Though it is not clearly illustrated, each of the printed electrodes 30 is connected to a respectively associated output port of the input device which is connected to the game computer via the connector cable 16.

In the construction set forth above, the input of a motion command for moving the character or characters on the image displayed on the television screen is done through the controller 15. The action of respective elements of the controller 15 will be discussed with reference to FIG. 3.

Practically, the motion command is input by means of the rotary controller 15 by sliding the movable member 22 on the supporting plate 23 by putting and maintaining the finger on the finger access surface 22b. If any finger pressure is exerted on the movable member 22 through the finger, the movable member 22 shifts downwardly while depressing the supporting plate 23. By this, the portion of the supporting plate 23 where the depression force is exerted through the movable member 22 is shifted downwardly. As a result, the lower face of the supporting member 23 mating with the hook 24 shifts downwardly causing a tilting action of the guide member 20. Therefore, the lower end of the hook 24 comes into contact with the section 27a of the cylindrical projection 27 of the electrode cover 26. Therefore, the movable contact 28 carried by the section 27a comes into contact with the printed electrode 30 to establish electric communication. By this HIGH level signal as a command for shifting the character or characters in a direction corresponding to the position of the movable member is output through the corresponding output port of the input device.

Figure 4:
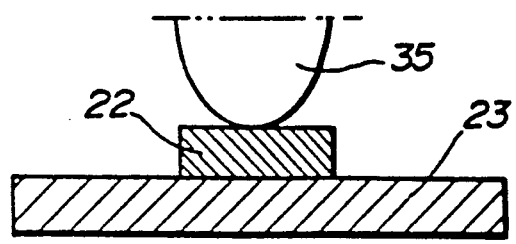
FIG. 4 is a sectional view showing the manner of input through the preferred embodiment of the input device of FIG. 1.

It should be noted that when the movable member 22 is in the bi-direction input position, two of the adjacent legs 22d are simultaneously shifted to depress respectively associated sections 27a for establishing electrical communications at respectively corresponding printed electrodes 30. Therefore, in this case, two HIGH level signals as commands for shifting the character or characters in respectively corresponding directions, are output from associated output ports. As a result, the character or characters are shifted in 45° direction between the directions commanded by the HIGH level outputs through two output ports. As will be appreciated herefrom, the input device according to this embodiment is designed to permit the circular movable member 22 to be rotated 360 degrees on the smooth supporting plate 23 in the rotary controller 15 for switching any one of 8 directions including upper, lower, right, left and 45 degrees-slanted directions. With the construction set forth above, the movable member 22 can be operated rotatingly without having any supporting point on the supporting plate 23. Furthermore, the guide member 20 defines the area within which the movable member 22 moves within a smooth circular edge of the circular opening 21 of the guide member 20. In addition, the shown embodiment of the input device also defines the coefficient of kinetic friction between the movable member 22 and the supporting plate 23, as shown in FIG. 4, in a range of 0.35 to 0.40. As a result, the kinetic friction can be reduced by 50% in comparison with the case where the finger is directly slid for inputting information in prior arts. Thus, the pressure for doing an inputting operation is reduced by half and the response has become very quick. The structure of this embodiment is allowed to be manufactured at a low cost and at a low reject rate.

Figure 5:
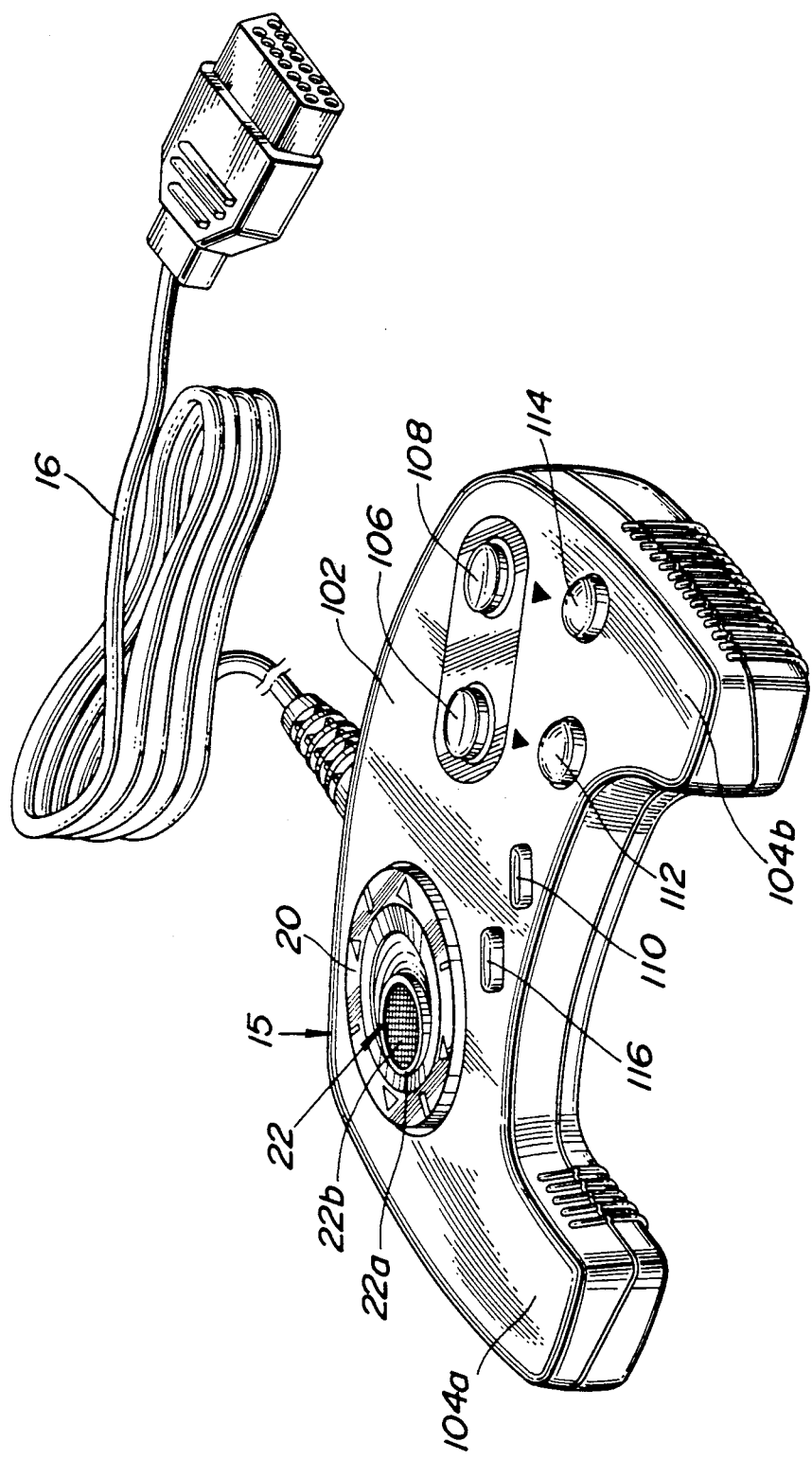
FIG. 5 is a perspective illustration of the practical embodiment of input device.

FIG. 5 is an external view of a modified embodiment of the input device, according to the invention for game computer. As seen from FIG. 5, a casing 100 is in an essentially U-shaped configuration with an elongated major section 102 and extensions 104a and 104b extending from both longitudinal ends of the major section.

These extensions 104a and 104b are so configured as to be gripped by player's hands.

The shown modification includes push buttons 106 and 108 which correspond to the push buttons 11 and 12 of the former embodiment. Also, the push button 110 corresponds to the push button 13. In addition to these, the shown embodiment includes push buttons 112 and 114 which are respectively oriented in the vicinity of the push buttons 106 and 108. These buttons 112 and 114 essentially serve for inputting the same function commands as associated with one of the push buttons 106 and 108. However, these push buttons 112 and 114 are designed for automatically commanding the function as rapidly. Such push buttons 106 and 108 are thus useful for rapid and continuous shooting in a shooting game. Another additional push button 116 may be provided for commanding a selection of games, game levels or so forth.

As seen from FIG. 5, the shown embodiment employs the rotary controller 15 which is identical in construction as that illustrated with respect to the former embodiment and thus is not discussed further.

The shown configuration of the input device may give a better feeling in playing the same of the game computer as it has extensions serving as handle for gripping.

Though the discussion given hereabove is concentrated on an application of the shown embodiment of the input device for the game computer, the input device may be useful for controlling cursor positions in data computers, such as that performed by a mouse. In this case, the input device of the present invention is used in place of a mouse and less space around the data computer may be required since the input device of the invention can be compact enough.

While the present invention has been disclosed in terms of the preferred embodiment in order to facilitate a better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A data input device comprising:
  a controller assembly including a manually accessible movable member having a manually accessible section and a slider section integrally formed with said manually accessible section and slidably supported on a supporting base, said slider section being in a form of a disk, said manually accessible section being formed on said slider section and having a finger-receiving portion for receiving at least a portion of a finger of a user, said supporting base having a plane surface at an upper side thereof for contacting a plane surface of a lower side of said slider section, said supporting base permitting manual movement of said movable member in a direction generally perpendicular to the direction of the slide on said supporting base in response to a manual depression force for inputting data, said controller assembly also including a guide means defining an area of unbiased sliding motion of said movable member on said supporting base;
  a resilient means for resiliently supporting said controller assembly at a plurality of supporting points, said resilient means being deformable in response to the depression force; and
  electric means, responsive to deformation of said resilient means, for generation an output signal indicative of input data corresponding to the position of said movable member, at which position said inputting force is exerted.

2. A data input device as set forth in claim 1, wherein said manually accessible section of said movable member comprises a projection and said slider section is in a form of disk.

3. A data input device as set forth in claim 2, wherein said guide means comprises a cover which has a center hole opening at upper surface, and said projection of said movable member extends through said hole and is loosely guided by said hole.

4. A data input device as set forth in claim 3, wherein said projection is of cylindrical configuration with a circular-cross section concentric with said center hole.

5. A data input device comprising:
  a controller assembly including a manually accessible movable member having a manually accessible section comprising a projection and a slider section in the form of a disk integrally formed with said manually accessible section and slidably supported on a supporting base, said manually accessible section having a finger-receiving portion for receiving at least a finger of a user and formed on said slider section said supporting base having a plane surface at an upper side thereof for contacting a plate surface of a lower side of said slider section, said supporting base permitting movement of said movable member in a direction generally perpendicular to the direction of the slide on said supporting base in response to a depression force for inputting data, said controller assembly also including a guide means defining an area of sliding motion of said movable member on said supporting base, said guide means comprising a cover which has a center hole opening at an upper surface wherein said projection of said movable member extends through said hole and is loosely guided by said hole, said projection having a cylindrical configuration with a circular cross section concentric with said center hole, said guide means further having a plurality of legs around said hole, said supporting base further having a plurality of slots which receive said legs of said guide means;
  a resilient means for resiliently supporting said controller assembly at a plurality of supporting points, said resilient means being deformable in response to the depression force; and
  electric means, responsive to deformation of said resilient means, for generating an output signal indicative of an input data corresponding to the position of said movable member, at which said inputting force is exerted.

6. A data input device as set forth in claim 5, wherein said legs actuate said electric means.

7. A data input device as set forth in claim 5, wherein said supporting base has substantially flat and smooth upper surface, said movable member has substantially flat and smooth bottom surface mating with said upper surface of said support base with low friction therebetween, which bottom surface of said movable member is smaller than said upper surface of said supporting base.

8. A data input device as set forth in claim 5, wherein said supporting base and said movable member are made of a synthetic resin.

9. A data input device as set forth in claim 5, wherein said device controls a position of a cursor of a computer system.

10. A data input device for a digital processor and the line, comprising:

a plurality of normally open switches respectively connected to corresponding output ports connected to said digital processor for inputting data, wherein each of said normally open switches comprises a pair of mutually separated stationary terminals on a stationary base and a movable contact movable between a first position in which it is positioned away from said stationary terminals, and a second position in which it contacts with said stationary terminals for establishing electrical communication therebetween, thereby permitting output of data through said output port;

an elastically deformable contact carrier means which carries said movable contacts, said carrier means normally positioning said movable contact at said first position and allowing movement of said movable contact to said second position in response to an external depression force for inputting data;

a slider base means having a flat and smooth surface section extending over at least a part of said contact carrier, said sliding base means having an actuation means associated with said contact carrier for selectively exerting said external depression force for causing shifting of at least one of said movable contact from said first position to second position; and a manually operable member having a surface mating with said flat and smooth surface of said supporting base means, said manually operable member being sliding movable on said slider base means for allowing manual actuation of at least one of said normally open switches and transmitting a depression force manually exerted thereonto for actuating said supporting base means.

11. A data input device as set forth in claim 10, wherein said normally open switches are arranged with a regular interval.

12. A data input device as set forth in claim 11, wherein said normally open switches are arranged with 90° of angular interval.

13. A data input device as set forth in claim 11, wherein said supporting base means comprises a flat plate member defining said flat and smooth surface and a guide member defining an area within which said manually operable member is movable.

14. A data input device as set forth in claim 13, wherein said guide member defines a circular area to allow free movement of said manually operable member therewithin.

15. A data input device as set forth in claim 13, wherein said contact carrier means is elastically supporting said flat plate member in a normally parallel relationship with said stationary base and is responsive to said external depression force to be elastically deformed for allowing a change of attitude of said flat plate member to slant to approach said stationary base at the portion where said depression force is exerted for shifting at least one of said movable contacts oriented at the corresponding position from said first position to second position.

16. A data input device as set forth in claim 15, wherein said manually operable member is shiftable at positions intermediate between positions where said normally open switches are arranged, for simultaneous depression of two movable contacts for simultaneous input for two data.

17. A data input device as set forth in claim 10, which inputs a command for shifting cursor on a display of said digital processor in a desired direction in a two-dimensional coordinate system on said display, and said normally open switches are provided for commanding left and right movement of said cursor.

18. A data input device as set forth in claim 10, which inputs command for shifting curser on a display of said digital processor in a desired direction in a two-dimensional coordinate system on said display, and said normally open switches are provided for commanding up and down movement of said curser on said display.

19. A data input device as set forth in claim 10, wherein said manually operable member has a finger accessible section to receive operator's finger for causing shifting of said manually operable member according to movement of the finger.

20. A data input device as set forth in claim 1, wherein said finger-receiving portion on said manually accessible portion is concave.

21. A data input device comprising:

a controller assembly which includes a manually accessible movable member having a manually accessible portion for contact with a user and a slider section integrally formed with said manually accessible portion and slidably supported on a supporting base, said slider section having a substantially planar lower portion for contacting a substantially planar upper portion on said supporting base, said supporting base permitting movement of said movable member in a direction generally perpendicular to the direction of slide on said supporting base in response to a depression force for inputting data, said controller assembly also including a guide means defining an area of unbiased sliding motion of said movable member on said supporting base;

a resilient means for resiliently supporting said controller assembly at a plurality of supporting points, said resilient means being deformable in response to a depression force by said user on said manually accessible portion; and electrical means, responsive to deformation of said resilient means, for generating an output signal indicative of input data corresponding to the position of said movable member at which said inputting force is exerted.

* * * * *